US012469935B2

(12) United States Patent
Wang et al.

(10) Patent No.: US 12,469,935 B2
(45) Date of Patent: Nov. 11, 2025

(54) BATTERY PACK CASE AND BATTERY PACK

(71) Applicant: Contemporary Amperex Technology Co., Limited, Ningde (CN)

(72) Inventors: Lei Wang, Ningde (CN); Zhichao Wang, Ningde (CN); Derong Wang, Ningde (CN); Peng Wang, Ningde (CN); Linggang Zhou, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 18/381,653

(22) Filed: Oct. 19, 2023

(65) Prior Publication Data

US 2024/0047835 A1    Feb. 8, 2024

Related U.S. Application Data

(63) Continuation of application No. 16/981,711, filed as application No. PCT/CN2018/124620 on Dec. 28, 2018, now abandoned.

(30) Foreign Application Priority Data

Mar. 30, 2018    (CN) .......................... 201820465105.8

(51) Int. Cl.
*H01M 50/528*    (2021.01)
*H01M 50/209*    (2021.01)
(Continued)

(52) U.S. Cl.
CPC ....... *H01M 50/528* (2021.01); *H01M 50/209* (2021.01); *H01M 50/289* (2021.01); *H01M 50/593* (2021.01)

(58) Field of Classification Search
CPC ............. H01M 50/528; H01M 50/209; H01M 50/289; H01M 50/593; Y02E 60/10
See application file for complete search history.

(56) References Cited

U.S. PATENT DOCUMENTS

| 7,654,352 B2 * | 2/2010 | Takasaki | ............. H01M 50/278 |
| | | | 180/68.5 |
| 2011/0143179 A1 * | 6/2011 | Nakamori | ........... H01M 50/271 |
| | | | 429/99 |

(Continued)

FOREIGN PATENT DOCUMENTS

| CN | 206349427 | * | 7/2017 | .......... H01M 50/204 |
| WO | WO2017/047683 | * | 3/2017 | .............. H01M 2/10 |
| WO | WO2017/056742 | * | 4/2017 | .............. H01M 2/10 |

OTHER PUBLICATIONS

English Translation of CN206349427.*

*Primary Examiner* — Kiran Quraishi Akhtar
(74) *Attorney, Agent, or Firm* — East IP P.C.

(57) ABSTRACT

The present application relates to a battery pack case and a battery pack. The battery pack case includes: a bottom plate and a side plate connected to the bottom plate, the bottom plate and the side plate surround to form an accommodating portion configured to accommodate a unit cell; a plurality of first insulating strips are provided on a surface of the bottom plate facing the accommodating portion, the plurality of first insulating strips are sequentially spaced along a length direction or a width direction of the bottom plate, and a glue receiving groove is formed between two adjacent first insulating strips.

11 Claims, 4 Drawing Sheets

(51) Int. Cl.
*H01M 50/289* (2021.01)
*H01M 50/593* (2021.01)

(56) References Cited

U.S. PATENT DOCUMENTS

| | | | |
|---|---|---|---|
| 2014/0014418 A1* | 1/2014 | Komaki | H01M 50/209 |
| | | | 429/143 |
| 2018/0269438 A1* | 9/2018 | Nishikawa | H01M 50/55 |
| 2018/0358587 A1* | 12/2018 | Tononishi | H01M 50/291 |

* cited by examiner

BATTERY PACK CASE AND BATTERY PACK

CROSS-REFERENCE OF RELATED APPLICATIONS

This application is a continuation of U.S. patent application Ser. No. 16/981,711, filed on Sep. 17, 2020, which is a National Stage of International Application No. PCT/CN2018/124620, filed on Dec.28, 2018. The International Application claims priority to Chinese Patent Application No. 201820465105.8, titled "BATTERY PACK CASE AND BATTERY PACK" and filed on Mar. 30, 2018. The aforementioned patent applications are hereby incorporated by reference in their entireties.

TECHNICAL FIELD

The present application relates to the technical field of batteries, in particular to a battery pack case and a battery pack.

BACKGROUND

With the continuous development of new energy technologies, secondary batteries (rechargeable batteries) are more and more widely used, for example, hybrid vehicles or electric vehicles. However, the safety issues of devices using secondary batteries are gradually exposed to the public's vision, which also affects the development of secondary batteries. When the unit cells usually need to be used in groups, a bus bar is needed to connect each unit cell in series or in parallel. A plurality of unit cells form a battery module in groups. A plurality of battery modules are packaged through a pack case to form a battery pack. At present, in order to improve the energy density of the battery pack, the technical solutions basically adopt the bottom plate-free solution with the bottom of the battery module glued. However, the use of the bottom plate-free solution will also bring about the problem of insulation of the battery pack and the control of the amount of glue applied to the bottom of the battery, which cannot guarantee the safe distance and gluing thickness between the unit cell and the pack case. The battery system often causes an abnormal insulation alarm due to direct contact between the pack case and the unit cell, and the battery pack may also cause occurrence of dangerous situation due to the abnormal insulation.

SUMMARY

Embodiments of the present application provide a battery pack case and a battery pack. The battery pack case can effectively maintain the insulation state between the battery pack case and the unit cell and avoid the abnormal insulation alarm caused by contacting between the unit cell and the battery pack case. At the same time, the amount of glue can be controlled to ensure the uniform thickness of the glue.

In an aspect, an embodiment of the present application proposes a battery pack case, which includes: a bottom plate and a side plate connected to the bottom plate, the bottom plate and the side plate surround to define an accommodating portion for accommodating a unit cell; a plurality of first insulating strips arranged on a surface of the bottom plate facing the accommodating portion, and a plurality of first insulating strips are sequentially spaced along the length direction or the width direction of the bottom plate, and a glue receiving groove is formed between two adjacent first insulating strips.

According to an aspect of an embodiment of the present application, the battery pack case further includes a plurality of second insulating strips, a plurality of first insulating strips and each of the second insulating strips are arranged to intersect, a glue receiving groove is formed between two adjacent first insulating strips and two adjacent second insulating strips.

According to an aspect of an embodiment of the present application, the battery pack case further includes a first side insulating strip that extends along the length direction of the bottom plate and is disposed at connection between the long side of the bottom plate along the length direction of the bottom plate and the side plate in covering manner.

According to an aspect of the embodiment of the present application, a cross section of the first side insulating strip is L-shaped.

According to an aspect of an embodiment of the present application, the battery pack case further includes a second side insulating strip, the second side insulating strip extends along the width direction of the bottom plate, and is disposed at a wide side of the bottom plate along the width direction of the bottom plate, connected to the side plate in covering manner.

The battery pack case of the embodiment of the present application includes a bottom plate capable of supporting a unit cell and a side plate connected to the bottom plate. A plurality of first insulating strips with good insulation performance are provided on the bottom plate. The first insulating strips are arranged between the bottom of the unit cell and the bottom plate, which can isolate the unit cell from the bottom plate, keep a predetermined distance between them and insulate from each other, and avoid contacting between them and the occurrence of insulation abnormalities, causing electrical connection between the two and there is a danger of short circuit and fire. A glue receiving groove is formed between two adjacent first insulating strips to facilitate filling a predetermined amount of insulation glue. The first insulating strip can prevent the insulating glue from overflowing. The first insulating strip can control the thickness of the insulating glue layer through its own thickness, thereby ensuring a flat surface of the insulating glue and also avoiding waste of the insulating glue.

In another aspect, an embodiment of the present application provides a battery pack, including: a battery pack case comprising a bottom plate and a side plate connected to the bottom plate, the bottom plate and the side plate surround to define an accommodating portion configured to accommodate a unit cell; and a plurality of first insulating strips provided on a surface of the bottom plate facing the accommodating portion, the plurality of first insulating strips are sequentially spaced along a length or width direction of the bottom plate, and a glue receiving groove is formed between two adjacent first insulating strips; a plurality of battery assemblies, provided in the accommodating portion, the plurality of battery assemblies are arranged side by side along the width direction of the bottom plate, each battery assembly includes a plurality of unit cells arranged side by side along the length direction of the bottom plate; the first insulating strip is disposed between the bottom of the battery assembly and the bottom plate.

According to another aspect of the embodiments of the present application, the battery pack further includes a first insulating buffer sheet that extends along the length direction of the bottom plate, and the first insulating buffer sheet is disposed between the battery assembly adjacent to the side plate and the battery pack case.

According to another aspect of the embodiments of the present application, the first insulating buffer sheet includes a first connection section and a second connection section that intersect, the first connection section is bonded to a surface of the battery assembly facing the side plate, and the second connection section is positioned between the bottom of the battery assembly and the bottom plate.

According to another aspect of the embodiments of the present application, the battery pack further includes a second insulating buffer sheet, the second insulating buffer sheet extends along the width direction of the bottom plate, a second insulating buffer sheet is provided between the bottoms of the two unit cells positioned on the outermost side of the battery assembly and the battery pack case.

According to another aspect of the embodiments of the present application, the second insulating buffer sheet includes a accommodating recess, a part of the bottoms of the two unit cells is inserted into the accommodating recess to be covered by the second insulating buffer sheet, and the second insulating buffer sheet is bonded to the two unit cells.

BRIEF DESCRIPTION OF THE DRAWINGS

The features, advantages, and technical effects of exemplary embodiments of the present application will be described below with reference to the drawings.

Figure 1:
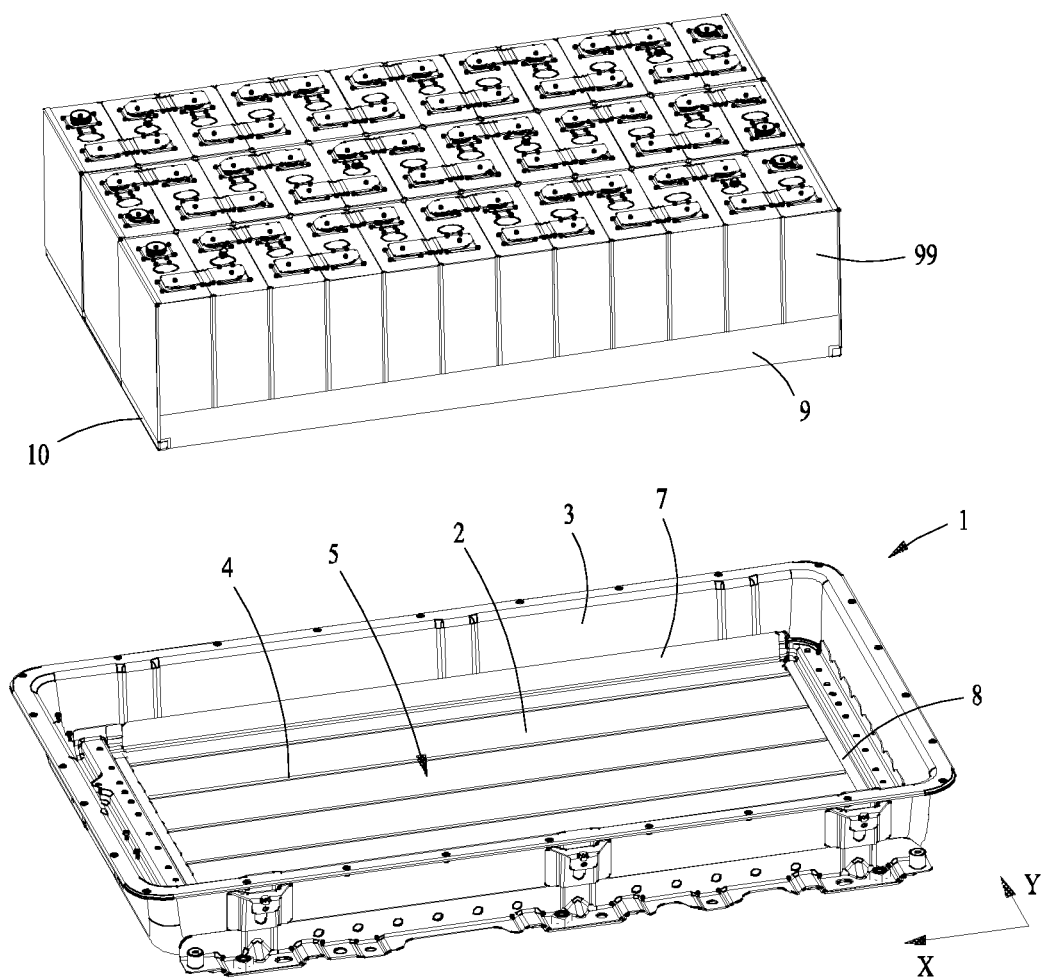
FIG. 1 is a schematic diagram of an exploded structure of a battery pack case and a unit cell according to an embodiment of the present application.

In the drawings, the drawings are not drawn to actual scale.
1. battery pack case;
2. bottom plate;
3. side plate;
4. first insulating strip;
5. glue receiving groove;
6. second insulating strip;
7. first side insulating strip; 7a. first long side; 7b. second long side;
8. second side insulating strip;
9. first insulating buffer sheet; 9a. first connection section; 9b. second connection section;
10. second insulating buffer sheet; 101. first covering sheet; 102. second covering sheet; 103. third covering sheet; 104. fourth covering sheet;
99. unit cell;
100. double-sided adhesive;
X length direction; Y width direction.

DETAILED DESCRIPTION

The implementation of the present application will be described in further detail below with reference to the drawings and examples. The detailed description and drawings of the following embodiments are used to exemplarily illustrate the principle of the present application, but cannot be used to limit the scope of the present application, that is, the present application is not limited to the described embodiments.

In the description of the present application, it need be noted that, unless otherwise stated, the meaning of "plurality" is two or more; orientations or positional relationships indicated by the terms "upper", "lower", "left", "right", "inner", "outside", etc. are only for the convenience of describing the present application and simplifying the description, rather than indicating or implying that the device or element referred to must include a specific orientation, be constructed and operated in a specific orientation, and therefore cannot be understood as a limitation to the present application. In addition, the terms "first", "second", etc. are used for descriptive purposes only, and cannot be understood as indicating or implying relative importance.

In the description of the present application, it need also be noted that, unless otherwise clearly specified and limited, the terms "install", "be connected with", and "connect" should be understood in a broad sense, for example, it can be fixed connected or detachably connected, or integrally connected; it can be either directly connected or indirectly connected through an intermediary. For those of ordinary skill in the art, the specific meanings of the above terms in the present application may be understood according to specific circumstances.

In order to better understand the present application, the battery pack case of the embodiment of the present application will be described in detail below with reference to FIGS. 1 to 5.

Figure 2:
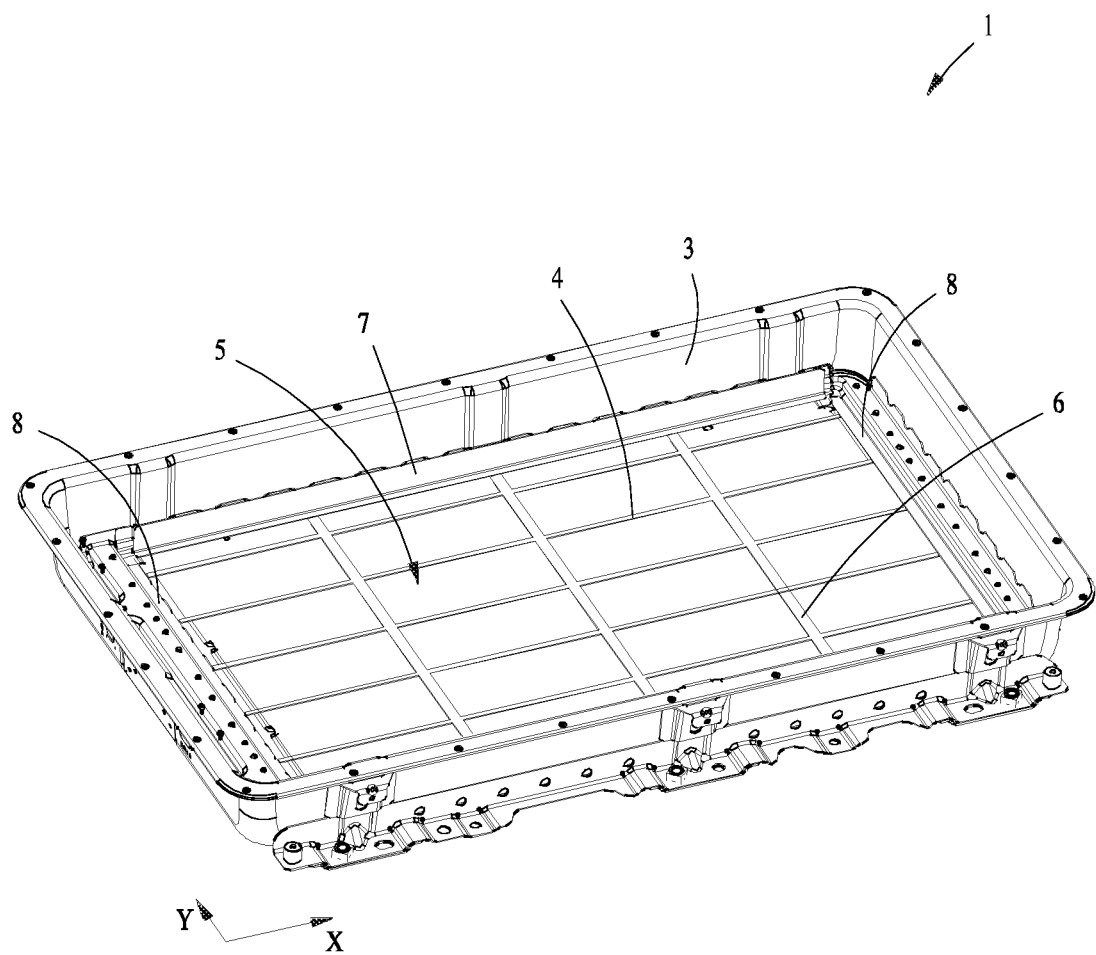
FIG. 2 is a schematic diagram of the overall structure of a battery pack case according to an embodiment of the present application.
Figure 3:
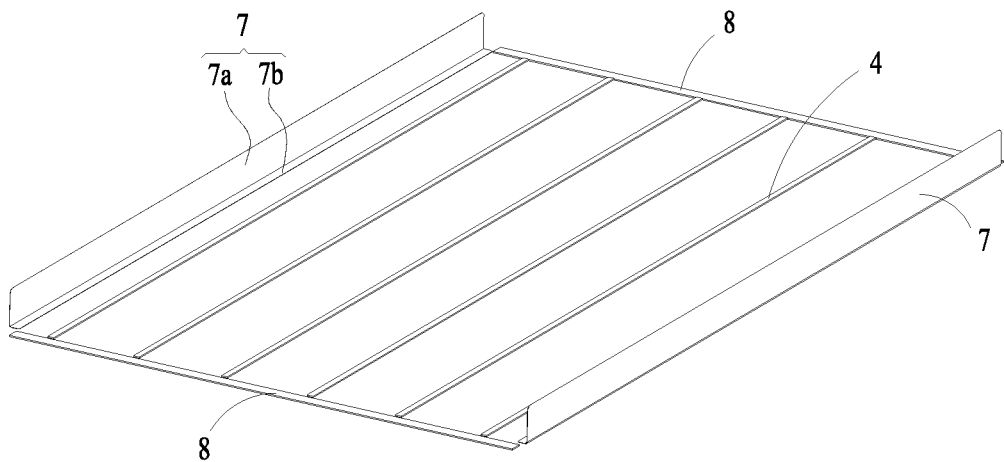
FIG. 3 is a schematic diagram of a combined structure of a first insulating strip, a first side insulating strip, and a second side insulating strip according to an embodiment of the present application.
Figure 4:
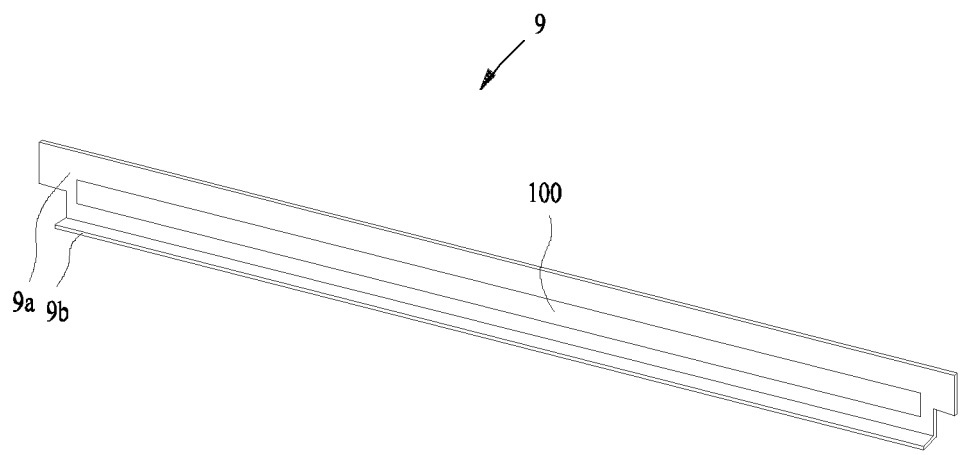
FIG. 4 is a schematic diagram of the overall structure of a first insulating buffer sheet according to an embodiment of the present application.
Figure 5:
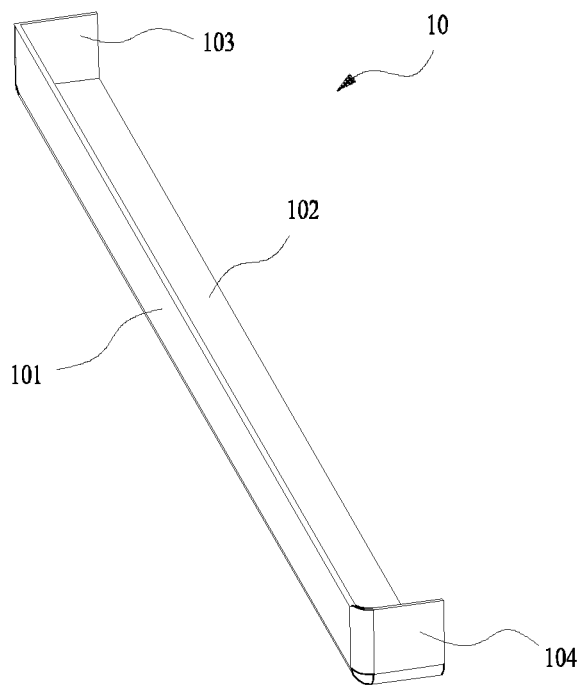
FIG. 5 is a schematic diagram of the overall structure of a second insulating buffer sheet according to an embodiment of the present application.

FIG. 1 schematically shows an exploded structure of a battery pack case 1 and a unit cell 99 according to an embodiment of the present application. FIG. 2 schematically shows the overall structure of the battery pack case 1 according to an embodiment of the present application. FIG. 3 schematically shows the combined structure of the first insulating strip 4, the first side insulating strip 7 and the second side insulating strip 8 according to an embodiment of the present application. FIG. 4 schematically shows the overall structure of the first insulating buffer sheet 9 according to an embodiment of the present application. FIG. 5 schematically shows the overall structure of the second insulating buffer sheet 10 according to an embodiment of the present application.

As shown in FIG. 1, the battery pack case 1 of the present application is used to accommodate a unit cell 99 to form protection for the unit cell 99. At the same time, it can also accommodate the wiring harness or other electronic components related to the use of the unit cell 99 and protect them. The unit cell 99 of the present embodiment may be a square battery.

The battery pack case 1 of the embodiment of the present application includes a bottom plate 2 and a side plate 3 connected to the bottom plate 2. The bottom plate 2 and the side plate 3 surround to form an accommodating portion for accommodating the unit cell 99. The unit cell 99 is put into the battery pack case 1 through the opening of the accommodating portion. A surface of the bottom plate 2 of the present embodiment facing the accommodating portion is provided with a plurality of first insulating strips 4. The plurality of first insulating strips 4 are sequentially spaced along the length direction X or the width direction Y of the bottom plate 2. A glue receiving groove 5 is formed between two adjacent first insulating strips 4.

On the one hand, when the unit cell 99 is installed and fixed in the battery pack case 1, the first insulating strip 4 isolates the unit cell 99 from the bottom plate 2 to maintain a predetermined distance between the unit cell 99 and the bottom plate 2. In this way, effective insulation can be maintained between the unit cell 99 and the bottom plate 2 to avoid the occurrence of an abnormal insulation alarm caused by the unit cell 99 directly contacting the bottom plate 2 and also avoid the burr on the surface of the bottom plate 2 from puncturing the housing of the unit cell 99, thus effectively protecting the safety of the unit cell 99. Generally, the flatness of the bottom plate 2 is poor, which may easily cause insulation abnormality when the unit cell 99 contacts the bottom plate 2. After the first insulating strip 4 is provided on the bottom plate 2, the height of the first insulating strip 4 can offset the difference of the height of the surface of the bottom plate 2 to ensure that the tops of the respective unit cells 99 are flush, and also effectively avoid the surface of the bottom plate 2 from contacting the unit cell 99.

On the other hand, before the unit cell 99 is installed and fixed, an insulating glue is filled in advance in the glue receiving groove 5 formed between the two adjacent first insulating strips 4. Since the thickness of the first insulating strip 4 itself can be designed as a predetermined value as needed, the thickness of the insulating glue layer can be accurately controlled by the thickness of the first insulating strip 4. In this way, when the unit cell 99 is seated on the first insulating strip 4 on the bottom plate 2, it will flatten the insulating glue under its own gravity. The insulating glue is blocked by the first insulating strip 4 and will not overflow in any directions so as to avoid the insulating glue from overflowing and polluting other structural parts. At the same time, it also avoids the waste of insulating glue and saves costs. The insulating glue layer can form an insulating protective layer, which further avoids the occurrence of an abnormal insulation alarm caused by the bottom plate 2 contacting the unit cell 99, and also avoids the burr on the bottom plate 2 from puncturing the unit cell 99.

The two adjacent first insulating strips 4 in the present embodiment are arranged in parallel. When the unit cell 99 is seated on the two adjacent first insulating strips 4, it can provide stable and balanced support for the unit cell 99 and avoid the unit cell 99 from tilting. The width of each of the glue receiving grooves 5 formed between two adjacent first insulating strips 4 is the same. Alternatively, the plurality of first insulating strips 4 are arranged in parallel at equal intervals between each other.

As shown in FIG. 2, the battery pack case 1 of the present embodiment further includes a plurality of second insulating strips 6. A plurality of first insulating strips 4 and each second insulating strip 6 are arranged to intersect. A glue receiving groove 5 is formed between two adjacent first insulating strips 4 and two adjacent second insulating strips 6. The glue receiving groove 5 is a closed space, and the insulating glue can overflow in the horizontal direction. Alternatively, the plurality of second insulating strips 6 are arranged in parallel at intervals between two adjacent second insulating strips 6. Further, the plurality of second insulating strips 6 are arranged in parallel at equal intervals between two adjacent second insulating strips 6. The plurality of first insulating strips 4 and the plurality of second insulating strips 6 form a grid-like structure, which can effectively support the unit cell 99 and prevent the unit cell 99 from contacting the bottom plate 2. Alternatively, the first insulating strip 4 and the second insulating strip 6 are perpendicular to each other.

In one embodiment, both the first insulating strip 4 and the second insulating strip 6 are connected and fixed to the bottom plate 2 by means of bonding. Alternatively, a double-sided adhesive 100 is provided on the first insulating strip 4 and the second insulating strip 6 so as to conveniently and quickly bond the first insulating strip 4 and the second insulating strip 6 to the bottom plate 2.

As shown by combining FIG. 2 and FIG. 3, the battery pack case 1 of the present embodiment further includes a first side insulating strip 7. The first side insulating strip 7 extends along the length direction X of the bottom plate 2 and covers the connection between the long side of the bottom plate 2 and the side plate 3. The bottom plate 2 includes two opposite long sides. One first side insulating strip 7 is provided between each long side and the side plate 3. The first side insulating strip 7 can effectively isolate the unit cell 99 from the side plate 3 to avoid the insulation abnormality caused by the unit cell 99 contacting the side plate 3, and meanwhile also avoid the burrs on the side plate 3 from puncturing the unit cell 99.

Alternatively, the first side insulating strip 7 includes a first long side 7a and a second long side 7b. The first long side 7a is connected to the side plate 3, and the second long side 7b is connected to the bottom plate 2. The first long side 7a and the second long side 7b are perpendicular to each other, so that the entire cross section of the first side insulating strip 7 includes an L-shaped structure.

Alternatively, the first side insulating strip 7 is connected and fixed to the battery pack case 1 by means of bonding. In one example, the double-sided adhesive 100 is provided on both the first long side 7a and the second long side 7b, so that the first long side 7a is easily and quickly bonded to the side plate 3, and the second long side 7b is bonded to the bottom plate 2. When the first insulating strips 4 are sequentially spaced along the length direction X of the bottom plate 2, all the first insulating strips 4 are disposed between the two first side insulating strips 7. One end of each first insulating strip 4 is connected to one first side insulating strip 7, and the other end of each first insulating strip 4 is connected to another first side insulating strip 7.

The battery pack case 1 of the present embodiment further includes a second side insulating strip 8. The second side insulating strip 8 extends along the width direction Y of the bottom plate 2 and is provided on the wide side of the bottom plate 2 connected to the side plate 3. The bottom plate 2 includes two opposite wide sides. One second side insulating strip 8 is provided on each wide side. When the first insulating strips 4 are sequentially spaced along the width direction Y of the bottom plate 2, all the first insulating strips 4 are disposed between the two second side insulating strips 8. One end of each first insulating strip 4 is connected to one second side insulating strip 8, and the other end of each first insulating strip 4 is connected to another second side insulating strip 8.

Alternatively, the bottom plate 2 and the side plate 3 are steel structures. The first insulating strip 4, the second insulating strip 6, the first side insulating strip 7 and the second side insulating strip 8 are all plastic or insulating resin.

The battery pack case 1 of the embodiment of the present application includes a bottom plate 2 capable of supporting the unit cell 99 and a side plate 3 connected to the bottom plate 2. A plurality of first insulating strips 4 with good insulation performance are provided on the bottom plate 2. The first insulating strip 4 is provided between the bottom of the unit cell 99 and the bottom plate 2 and can isolate the unit cell 99 from the bottom plate 2 to maintain a predetermined distance between the two and insulate from each other to avoid the occurrence of abnormal insulation caused by contacting between them, which causes electrical connection between the two and causes a danger of short circuit and fire. A glue receiving groove 5 is formed between two adjacent first insulating strips 4 to facilitate filling a predetermined amount of insulating glue. The first insulating strip 4 can prevent the insulating glue from overflowing. The first insulating strip 4 can control the thickness of the insulating glue layer through its own thickness, thereby ensuring a flat surface of the insulating glue and also avoiding waste of the insulating glue.

An embodiment of the present application further proposes a battery pack, which includes a battery pack case 1 and a plurality of battery assemblies provided in the battery pack case 1. The battery pack can provide power for the electrical equipment. A plurality of battery assemblies are arranged side by side along the width direction Y of the bottom plate 2. Each battery assembly includes a plurality of unit cells 99 arranged side by side along the length direction X of the bottom plate 2. The first insulating strip 4 is provided between the bottom of the battery assembly and the bottom plate 2. Since the first insulating strip 4 insulates and isolates the unit cell 99 from the bottom plate 2, the unit cell 99 will not contact with the bottom plate 2, so that the overall safety of the battery pack is good and the working process is stable.

As shown by combining FIG. 1 and FIG. 4, the battery pack of the present embodiment further includes a first insulating buffer sheet 9. The first insulating buffer sheet 9 extends in the length direction X of the bottom plate 2. The first insulating buffer sheet 9 is provided between the battery assembly adjacent to the side plate 3 and the battery pack case 1. The length of the first insulating buffer sheet 9 may be equal to the length of the battery assembly. The first insulating buffer sheet 9 can insulate and isolate the unit cell 99 from the battery pack case 1 to avoid the unit cell 99 from contacting with the battery pack case 1 or the unit cell 99 from being punctured by the bur on the battery pack case 1. The first insulating buffer sheet 9 can be deformed to a certain extent by being squeezed by the unit cell 99, so as to keep the unit cell 99 and the bottom plate 2 tight therebetween, and avoid the occurrence of gaps that may cause the position of the unit cell 99 unstable. Alternatively, the material of the first insulating buffer sheet 9 is plastic or rubber.

In one embodiment, the first insulating buffer sheet 9 includes a first connection section 9a and a second connection section 9b that intersect. The first connection section 9a is bonded to the surface of the battery assembly facing the side plate 3. The first connection section 9a is used to isolate the side surface of the battery assembly from the side plate 3. Optionally, a double-sided adhesive 100 is provided on the first connection section 9a, so that the first connection section 9a is conveniently and quickly bonded to the side surface of the battery assembly in the width direction Y. The second connection section 9b is positioned between the bottom of the battery assembly and the bottom plate 2. The second connection section 9b is used to isolate the bottom of the battery assembly from the bottom plate 2. Alternatively, a double-sided adhesive 100 is provided on the second connection section 9b, so that the second connection section 9b is conveniently and quickly bonded to the bottom surface of the battery assembly, which improves connection strength of the first insulating buffer sheet 9 and is not prone to falling off. Alternatively, the first connection section 9a and the second connection section 9b may be perpendicular to each other.

As shown in FIG. 1 and FIG. 5, the battery pack case 1 of the present embodiment further includes a second insulating buffer sheet 10. The second insulating buffer sheet 10 extends in the width direction Y of the bottom plate 2. In the length direction X of the battery assembly, a second insulating buffer sheet 10 is provided between the bottom of the two unit cells 99 positioned on the outermost side of the battery assembly and the battery pack case 1. The second insulating buffer sheet 10 can isolate the two unit cells 99 on the outermost side in the battery assembly from the battery pack case 1 to avoid the unit cells 99 from contacting with the battery pack case 1 or the unit cells 99 from being punctured by the bur on the battery pack case 1. The length of the second insulating buffer sheet 10 may be equal to the width of the battery assembly. The second insulating buffer sheet 10 deforms to a certain extent by being squeezed by the unit cell 99, so as to keep the unit cell 99 and the battery pack case 1 tight therebetween, and avoid the occurrence of gaps therebetween that may cause the position of the unit cell 99 unstable. Alternatively, the material of the second insulating buffer sheet 10 is plastic or rubber.

In one embodiment, the second insulating buffer sheet 10 includes an accommodating recess. A part of the bottom of the unit cell 99 is inserted into the accommodating recess, and the inserted part is covered by the second insulating buffer sheet In one embodiment, the second insulating buffer sheet 10 includes a first covering sheet 101 and a second covering sheet 102 that are perpendicular to each other and extend along the width direction Y of the bottom plate 2, and a third covering sheet 103 and a fourth covering sheet 104 which are connected to the first covering sheet 101 and the second covering sheet 102 at the same time. The third covering sheet 103 is perpendicular to the first covering sheet 101 and the second covering sheet 102 at the same time. The fourth covering sheet 104 is perpendicular to the first covering sheet 101 and the second covering sheet 102 at the same time. The third covering sheet 103 and the fourth covering sheet 104 are arranged to be parallel. The third covering sheet 103 is provided at one end of the first covering sheet 101 and the second covering sheet 102. The fourth covering sheet 104 is disposed at the other end of the first covering sheet 101 and the second covering sheet 102. The first covering sheet 101, the second covering sheet 102, the third covering sheet 103, and the fourth covering sheet 104 form the accommodating recess. The first cover sheet 101 is bonded to the side surface of the battery assembly in the length direction X, and the second cover sheet 102 is attached to the bottom of the unit cell 99. The third cover sheet 103 is attached to one of the two opposite side surfaces of the unit cell 99 along in the width direction Y of the bottom plate 2. The fourth cover sheet 104 is attached to the other of the two opposite side surfaces of the unit cell 99 along the width direction Y of the bottom plate 2. Alternatively, a double-sided adhesive 100 is provided on the third covering sheet 103 so as to bond conveniently and quickly the second insulating buffer sheet 10 to the side surface of the unit cell 99.

The battery pack of the present embodiment further includes an insulating glue layer (not shown in the figures). The insulating glue layer is disposed in the glue receiving groove 5. The battery assembly is connected and fixed to the bottom plate 2 through the insulating glue layer. The insulating glue layer can form an insulating protective layer, which further avoids the insulation abnormality alarm from occurring when due to the bottom plate 2 contacting the unit cell 99, and also avoids the burr on the bottom plate 2 from puncturing the unit cell 99.

Although the present application has been described with reference to the preferred embodiments, various improvements can be made and components therein can be replaced with equivalents without departing from the scope of the present application. In particular, as long as there is no structural conflict, the technical features mentioned in the various embodiments can be combined in any way. The present application is not limited to the specific embodiments disclosed herein, but includes all technical solutions falling within the scope of the claims.

What is claimed is:

1. A battery pack, comprising:
   a plurality of unit cells; and
   a battery pack case, comprising:
   a bottom plate and a side plate connected to the bottom plate, wherein the bottom plate and the side plate surround to define an accommodating portion configured to accommodate the plurality of unit cells;
   a plurality of first insulating strips provided on a surface of the bottom plate facing the accommodating portion, wherein the plurality of first insulating strips are sequentially spaced along a length or width direction of the bottom plate, and a glue receiving groove configured for filling an insulating glue is formed between two adjacent first insulating strips,
   wherein the plurality of first insulating strips are provided between the unit cells and the bottom plate so as to isolate the unit cells from the bottom plate and to maintain a predetermined distance between the unit cells and the bottom plate,
   the plurality of first insulating strips are connected and fixed to the bottom plate by means of bonding;
   the insulating glue is filled in the glue receiving groove that is formed between two adjacent first insulating strips, the plurality of first insulating strips are configured to block the insulating glue from overflowing by a thickness of the plurality of first insulating strips, and the insulating glue forms an insulating protective layer to separate the bottom plate from the unit cells; and
   the plurality of unit cells are fixed to the plurality of first insulating strips on the bottom plate by the insulating glue.

2. The battery pack according to claim 1, wherein the battery pack case further comprises a plurality of second insulating strips, the plurality of first insulating strips and each of the second insulating strips are arranged to intersect, and the glue receiving groove is formed between the two adjacent first insulating strips and two adjacent second insulating strips.

3. The battery pack according to claim 1, wherein the battery pack case further comprises a first side insulating strip, the first side insulating strip extends along the length direction of the bottom plate and is disposed at connection between a long side of the bottom plate along the length direction of the bottom plate and the side plate in a covering manner.

4. The battery pack according to claim 3, wherein a cross section of the first side insulating strip is L-shaped.

5. The battery pack according to claim 1, wherein the battery pack case further comprises a second side insulating strip, the second side insulating strip extends along the width direction of the bottom plate, and is disposed at a wide side of the bottom plate along the width direction of the bottom plate, connected to the side plate in a covering manner.

6. A battery pack, comprising:
   a battery pack case comprising
   a bottom plate and a side plate connected to the bottom plate, wherein the bottom plate and the side plate surround to define an accommodating portion configured to accommodate a unit cell; and
   a plurality of first insulating strips provided on a surface of the bottom plate facing the accommodating portion, wherein the plurality of first insulating strips are sequentially spaced along a length or width direction of the bottom plate, and a glue receiving groove configured for filling an insulating glue is formed between two adjacent first insulating strips;
   a plurality of battery assemblies provided in the accommodating portion, wherein the plurality of battery assemblies are arranged side by side along the width direction of the bottom plate, and each battery assembly comprises a plurality of unit cells arranged side by side along the length direction of the bottom plate; and
   the first insulating strips are arranged between a bottom of the battery assembly and the bottom plate,
   wherein the plurality of first insulating strips are provided between the plurality of unit cells and the bottom plate so as to isolate the unit cells from the bottom plate to maintain a predetermined distance between the unit cells and the bottom plate,
   the plurality of first insulating strips are connected and fixed to the bottom plate by means of bonding;
   the insulating glue is filled in the glue receiving groove that is formed between two adjacent first insulating strips, the plurality of first insulating strips are configured to block the insulating glue from overflowing by a thickness of the plurality of first insulating strips, and the insulating glue forms an insulating protective layer to separate the bottom plate from the unit cells; and
   the plurality of unit cells are fixed to the plurality of first insulating strips on the bottom plate by the insulating glue.

7. The battery pack according to claim 6, wherein the battery pack further comprises a first insulating buffer sheet, the first insulating buffer sheet extends along the length direction of the bottom plate, and the first insulating buffer sheet is provided between the battery assembly adjacent to the side plate and the battery pack case.

8. The battery pack according to claim 7, wherein the first insulating buffer sheet comprises a first connection section and a second connection section that intersect, the first connection section is bonded to a surface of the battery assembly facing the side plate, and the second connection section is positioned between the bottom of the battery assembly and the bottom plate.

9. The battery pack according to claim 6, wherein the battery pack further comprises a second insulating buffer sheet, the second insulating buffer sheet extends along the width direction of the bottom plate, and the second insulating buffer sheet is provided between bottoms of two unit cells positioned on the outermost side in the battery assembly and the battery pack case.

10. The battery pack according to claim 9, wherein the second insulating buffer sheet comprises a accommodating recess, a part of the bottoms of the two unit cells is inserted into the accommodating recess to be covered by the second insulating buffer sheet, and the second insulating buffer sheet is bonded to the two unit cells.

11. A method for manufacturing a battery pack, comprising:

providing a battery pack case comprising a bottom plate and a side plate connected to the bottom plate, wherein the bottom plate and the side plate surround to define an accommodating portion;

providing a plurality of first insulating strips connected to a surface of the bottom plate facing the accommodating portion by means of bonding, wherein the plurality of first insulating strips are sequentially spaced along a length or width direction of the bottom plate, a glue receiving groove configured for filling an insulating glue is formed between two adjacent first insulating strips that are configured to block the insulating glue from overflowing by a thickness of the plurality of first insulating strips, and the insulating glue forms an insulating protective layer to avoid the bottom plate contacting the unit cell; and providing a plurality of unit cells disposed on the plurality of first insulating strips, wherein the plurality of first insulating strips are provided between the plurality of unit cells and the bottom plate so as to isolate the plurality of unit cells from the bottom plate to maintain a predetermined distance between the unit cells and the bottom plate.

\* \* \* \* \*